United States Patent
Kappagantu

(10) Patent No.: US 8,511,440 B2
(45) Date of Patent: Aug. 20, 2013

(54) BRAKE ROTOR WITH EMBEDDED LOOSE-MASS DAMPER SYSTEM

(75) Inventor: Ramana Kappagantu, Canton, MI (US)

(73) Assignee: Material Sciences Corporation, Elk Grove Village, IL (US)

( * ) Notice: Subject to any disclaimer, the term of this patent is extended or adjusted under 35 U.S.C. 154(b) by 869 days.

(21) Appl. No.: 11/968,769

(22) Filed: Jan. 3, 2008

(65) Prior Publication Data

US 2009/0173585 A1 Jul. 9, 2009

(51) Int. Cl.
*F16D 65/38* (2006.01)

(52) U.S. Cl.
USPC .................................. 188/73.37; 188/218 XL

(58) Field of Classification Search
USPC ............... 188/73.35–73.37, 378, 218 XL, 188/382
See application file for complete search history.

(56) References Cited

U.S. PATENT DOCUMENTS

| | | | | |
|---|---|---|---|---|
| 3,207,009 A * | 9/1965 | Carlstedt | ........................ | 408/143 |
| 3,425,523 A * | 2/1969 | Robinette | ................. | 188/218 A |
| 3,687,244 A * | 8/1972 | Hillegass et al. | ......... | 188/218 A |
| 3,690,414 A * | 9/1972 | Aggarwal et al. | ............. | 188/378 |
| 3,938,626 A * | 2/1976 | Hopkins | ........................ | 188/378 |
| 3,983,973 A * | 10/1976 | Zboralski et al. | .......... | 188/218 A |
| 4,130,185 A * | 12/1978 | Densmore | ....................... | 188/378 |
| 4,553,884 A * | 11/1985 | Fitzgerald et al. | ............. | 408/143 |
| 5,295,411 A * | 3/1994 | Speckhart | ..................... | 74/574.3 |
| 5,533,422 A * | 7/1996 | Speckhart | ..................... | 74/574.3 |
| 6,241,055 B1 * | 6/2001 | Daudi | ......................... | 188/73.35 |
| 6,349,803 B2 * | 2/2002 | Brosilow | .................... | 188/73.37 |
| 7,004,294 B2 * | 2/2006 | Williams | ....................... | 188/378 |

FOREIGN PATENT DOCUMENTS

JP 2001-227571 * 8/2001

* cited by examiner

*Primary Examiner* — Xuan Lan Nguyen
(74) *Attorney, Agent, or Firm* — Quinn Law Group, PLLC

(57) ABSTRACT

A rotor is provided for use with a vehicle brake assembly that includes a forcing member operable to urge a friction member into mechanical communication with the rotor to thereby oppose movement of the same. The rotor includes a rotor body with an annular rim portion having first and second opposing contact faces. One or more loose-mass damper systems are interposed between the first and second contact faces, and operable to dissipate kinetic energy directly therefrom. Each of the loose-mass damper systems includes at least one mass operable to repeatedly impact against first and second inner faces respectively opposing the first and second contact faces to reduce oscillation of the rotor. Reducing oscillation of the rotor is independent of temperature and pressure. The loose-mass damper systems are preferably oriented proximate to an outer peripheral edge of the annular rim portion generally circumferentially equidistant from one another.

8 Claims, 4 Drawing Sheets

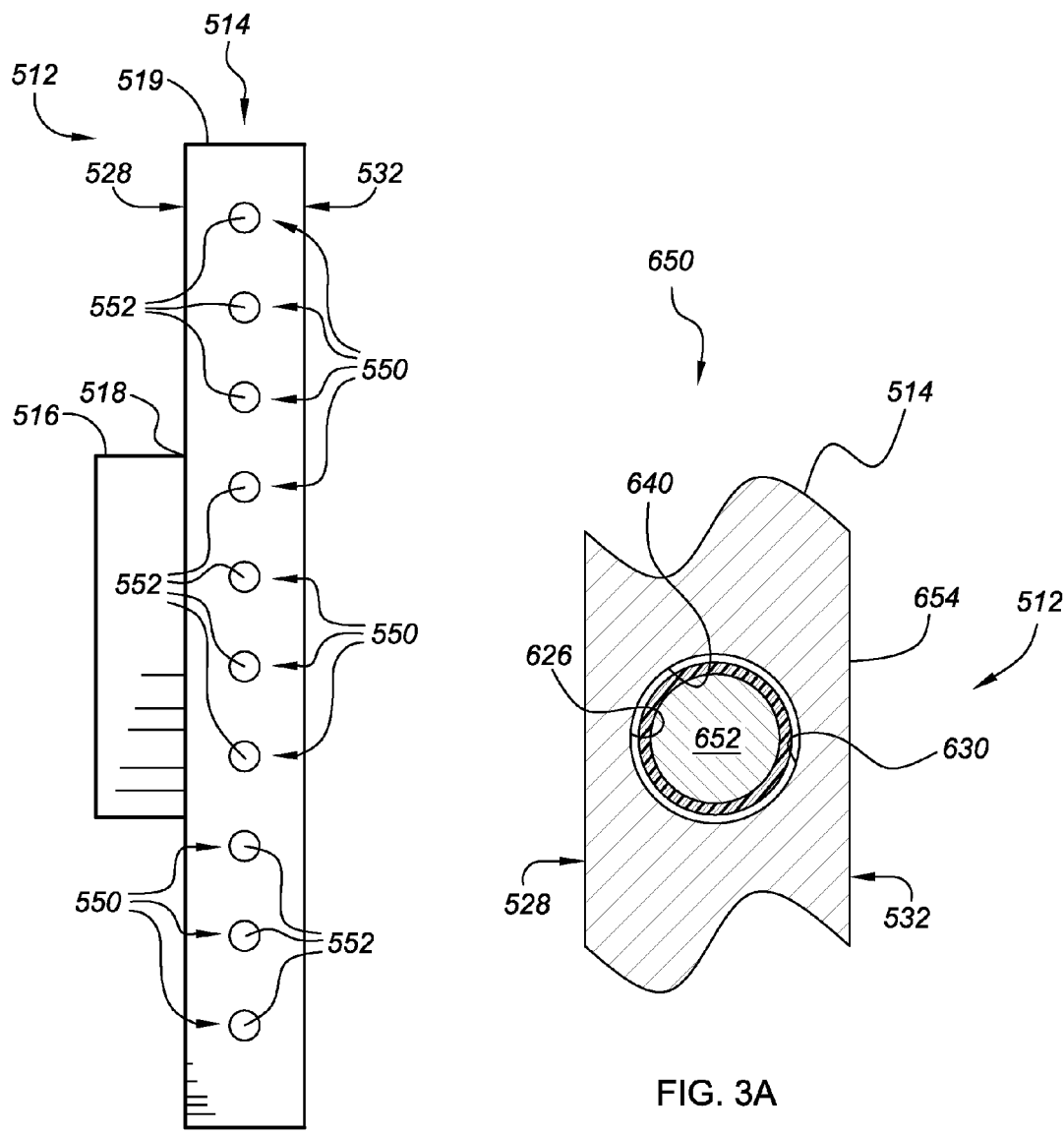

BRAKE ROTOR WITH EMBEDDED LOOSE-MASS DAMPER SYSTEM

TECHNICAL FIELD

The present invention relates generally to braking systems for motorized vehicles, and more particularly to devices for minimizing or cancelling vibrations and dampening resultant noise produced by vehicle brake systems.

BACKGROUND OF THE INVENTION

Most conventional motorized vehicles, including, but not limited to, automobiles, trucks, buses, construction vehicles, aircraft, etc., are equipped with a brake system for selectively slowing or stopping movement of the vehicle in a controlled manner. Modern automotive braking systems may be grouped into two basic categories, disc brakes and drum brakes. A typical automotive brake system may include a disc brake assembly for each of the front wheels, and either a drum brake assembly or a disc brake assembly for each of the rear wheels. Regardless of type, brake assemblies are normally actuated by hydraulic, pneumatic, or mechanical pressure generated by an operator of the vehicle by, for example, depressing a foot pedal, pulling a hand lever, and like methods.

The primary components of a conventional disc brake assembly are the brake disc or rotor, caliper, one or more pistons, and two or more brake pads (also known as brake linings). The brake pads have a frictional lining supported by a rigid backing plate. The rotor is typically mounted so as to rotate with the axle of the wheel to be braked, configured to transmit braking forces from the caliper assembly to the wheel.

The caliper assembly, which houses the friction pads and pistons therein, is either solidly attached (fixed-type) or slidably mounted (floating-type) to a stationary, non-rotatable component of the vehicle, such as the vehicle frame. The piston(s), traditionally having a circular transverse cross-section, is slidably received in a cylinder bore of the caliper such that the centerline of the piston is parallel to the axis of rotation of the rotor. Through the application of pressure, whether it be hydraulic, mechanical, or pneumatic, the piston is forced to translate and push or press against a respective brake pad. In so doing, the brake pad is urged or depressed against a surface of the disc rotor to thereby oppose and restrain rotational movement of the disc rotor through mechanical friction.

Most rotor designs are "vented"—each rotor has two annular cheeks axially connected by means of vanes. The passage ways between the vanes (referred to in the art as "vents") are mainly used for cooling of the rotors. Some rotor designs have no vanes and are referred to in the industry as "solid rotor discs".

During a braking application, the brake pad and rotor may vibrate and generate a high-pitched brake noise, referred to in the art as "brake squeal." For example, when the friction material of the brake pad unevenly contacts the rotor of a disc brake assembly, the coupling causes the pad and rotor to oscillate and vibrate (known as "force-coupled excitation"). Additionally, as the brake assembly components heat up, the rotor may develop hot spots. The hot spots can cause the rotor to have regions of varying depth and friction, producing inconsistent levels of brake torque, and potentially exacerbating the aforementioned brake squeal. Brake squeal is generally unappealing and unpleasant to vehicle occupants, pedestrians, etc., especially as vehicles are designed to be more comfortable and quieter. Hence, vehicle noise, vibration, and harshness (NVH) is an important priority for today's original equipment vehicle manufacturers (OEM).

Efforts have been made to remedy or at least alleviate brake squeal. Some simple techniques like beveling or chamfering the linings, greasing the contact portion between the caliper and the linings, increasing the density of the backing plate, etc., help reduce squeal. Another approach to reducing or preventing brake squeal is to use a brake pad shim, generally interposed between the piston and backing plate of the brake pad, in order to attenuate or reduce the magnitude of vibrations (resonance instability) of the brake pad and the rotor.

SUMMARY OF THE INVENTION

Provided herein is a family of brake discs or rotors embedded with a loose-mass damper system for reducing noise produced by a brake assembly of a motorized vehicle. The loose-mass damper systems described hereinbelow augment the dissipation of kinetic energy generated during a braking operation by attenuating the energy at the source—i.e., between the frictional contact surfaces of the rotor. The present invention offers high-temperature durability and significant sound damping characteristics that are independent of temperature and pressure. As such, the rotors provided herein can be adapted for different braking pressures, and for implementation into various braking applications.

According to one aspect of the present invention, a rotor is provided for use with a vehicle brake assembly. The brake assembly includes a forcing member that is operable to urge a friction member into mechanical communication with the rotor and thereby oppose movement of the same. The rotor includes a rotor body having an annular rim portion. The annular rim portion has a first contact face substantially opposing a second contact face. At least one, but preferably several loose-mass damper systems are interposed between the first and second contact faces and operable to dissipate kinetic energy directly therefrom.

According to one preferred embodiment, the annular rim portion defines one or more cavities therein, coinciding in number with the number of loose-mass damper systems. To this regard, a respective one of the loose-mass damper systems is embedded within each of the cavities. Ideally, each cavity has a generally spherical configuration and, correspondingly, each loose-mass damper system includes a substantially spherical member operable to translate laterally within a respective cavity relative to the first and second contact faces. It is desirable that the spherical member consists of a steel ball. Furthermore, the cavities are preferably oriented proximate to an outer peripheral edge of the annular rim portion generally circumferentially equidistant from one another.

According to another preferred embodiment, the annular rim portion includes first and second coaxially aligned disc members that are connected via a plurality of web or vane members that extend therebetween. The first disc member includes a first inner face opposing the first contact face, whereas the second disc member includes a second inner face facing the first inner face and opposing the second contact face.

In accordance with this preferred embodiment, the loose-mass damper systems can take on various configurations. By way of example, the first inner face may define a first plurality of semispherical grooves opposing a second plurality of semispherical grooves defined by the second inner face. In this particular instance, each of the plurality of loose-mass damper systems comprises a substantially spherical member embedded between and operatively supported by respectively opposing first and second semispherical grooves. Similar to the first embodiment, it is preferred that the spherical member consists of a steel ball.

Alternatively, each of the plurality of loose-mass damper systems includes a cylindrical member defining an axial channel therethrough. The channel is configured to receive a dowel member that extends between and attaches to the first and second disc members to slidably support the cylindrical member thereon. As another alternative, each of the plurality of loose-mass damper systems includes a plurality of ring members coaxially aligned to define an axial channel therethrough. The channel is configured to receive a dowel member that extends between and attaches to the first and second disc members to slidably support the plurality of ring members thereon.

According to another aspect of the present invention, a brake assembly is provided for use with a motorized vehicle that has one or more wheels. The brake assembly includes a rotor having an annular rim portion with a flange portion extending generally orthogonally from an inner peripheral edge thereof. The annular rim portion has a first contact face substantially opposing a second contact face. The rotor is rotatably mounted to the vehicle via the flange portion such that the rotor is operable to transmit braking forces to the vehicle wheel(s). A housing member is mounted proximate to the rotating member. One or more friction members are disposed within the housing member and configured to frictionally engage the rotor. An urging member is also disposed within the housing member, and configured to selectively effect the frictional engagement between the friction members and the rotor. A plurality of loose-mass damper systems is interposed between the first and second contact faces and operable to dissipate kinetic energy directly therefrom.

According to yet another aspect of the present invention, an improved method of damping noise produced by a vehicle brake system is provided. The brake system includes a forcing member configured to operatively engage a friction member with a rotating member. The rotating member has an annular rim portion with first and second substantially opposing contact faces. The method includes the step of: reducing oscillation of the rotating member by interposing a loose-mass damper system between the first and second contact faces to thereby dissipate kinetic energy directly therefrom. Preferably, the method also includes embedding a plurality of the loose-mass damper systems at preselected locations within the annular rim portion. Each of the plurality of loose-mass damper systems includes at least one mass, such that reducing oscillation of the rotating member includes repeatedly impacting the mass against first and second inner faces respectively opposing the first and second contact faces of the rotor. Reducing oscillation of the rotating member is independent of temperature and pressure.

The above features and advantages, and other features and advantages of the present invention, will be readily apparent from the following detailed description of the preferred embodiments and best modes for carrying out the present invention when taken in connection with the accompanying drawings and appended claims.

BRIEF DESCRIPTION OF THE DRAWINGS

FIG. 3 is a side-view illustration of a brake rotor with embedded loose-mass damper system in accordance with another embodiment of the present invention; and FIG. 3A is cross-sectional view of the brake rotor of FIG. 3 illustrating a loose-mass damper system in accordance with a fourth configuration embedded therein.

DESCRIPTION OF THE PREFERRED EMBODIMENTS

Figure 1:
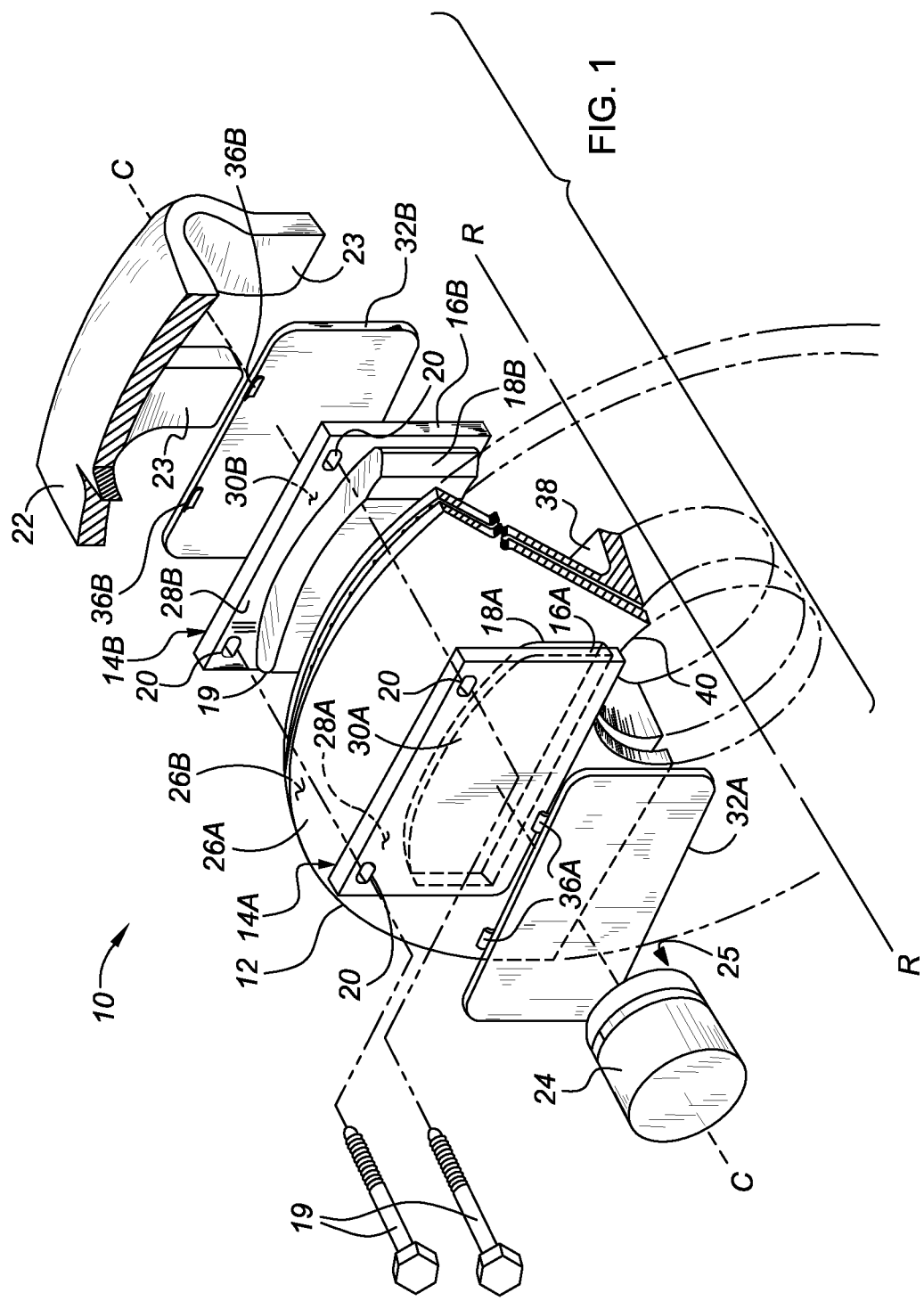
FIG. 1 is an exploded perspective illustration of a representative vehicle disc brake assembly for use of the brake rotors with embedded loose-mass damper systems of the present invention.

Referring to the Figures, wherein like reference numbers refer to like components throughout the several views, FIG. 1 is an exploded perspective illustration of a vehicle disc brake assembly, identified generally as 10, in accordance with the present invention. The disc brake assembly 10 is illustrated in FIG. 1 as single-piston, floating-type caliper. However, the present invention may be applied to multiple-piston brake assemblies and fixed-type calipers without departing from the inventive concept described herein. In addition, the application of FIG. 1 is provided merely for explanatory purposes—the constituent members are purely exemplary and the dimensions thereof exaggerated for clarity and for a better understanding of the present invention. As such, the present invention is not intended to be limited to the structure provided in FIG. 1.

The disc brake assembly 10 of FIG. 1 includes one or more friction members, defined herein by first and second brake pads 14A and 14B, respectively, each disposed on a respective side of a disk brake or rotor 12. The rotor 12 is rotatably mounted with the axle of a vehicle wheel—e.g., via hat or flange portion 38 extending orthogonally from an inner peripheral edge 40 thereof, and thereby configured to transmit braking forces from the disc brake assembly 10 to the vehicle wheel (not shown). The first and second brake pads 14A, 14B each include a respective backing plate 16A, 16B of sufficient rigidity to support first and second friction linings 18A and 18B, respectively, correspondingly mounted on the backing plate face 28A, 28B proximate to the rotor 12. The frictional lining 18A, 18B is the element of the brake pads 14A, 14B that contacts the rotor 12 to provide the frictional force necessary to slow the vehicle (not shown). The first and second brake pads 14A, 14B are slidably supported within the brake assembly 10, e.g., via guide pins 19 which extend through identical openings 20 in the upper left- and right-extents of each backing plate 16A, 16B and affix to a caliper housing, shown partially broken away in FIG. 1 as 22.

In operation, the first and second brake pads 14A, 14B are collaboratively urged towards one another by piston 24 and housing tabs 23, respectively, coaxially translating along a centerline C. The piston 24 is slidably received in a cylinder bore (not shown) of the caliper housing 22 such that the centerline C of the piston 24 and brake pads 14A, 14B is parallel to the axis of rotation R of the rotor 12. The piston 24 can be actuated by mechanical, hydraulic, or pneumatic pressure, or by electro-mechanical force (e.g., in an electronic braking system). The force of the piston 24 presses the linings 18A, 18B of each brake pad 14A, 14B into frictional engagement with first and second contact faces or friction surfaces 26A and 26B, respectively, of the rotor 12. In other words, the transverse load of the piston 24 is transmitted as mechanical friction to the rotor surfaces 26A, 26B via the first and second brake pads 14A, 14B thereby opposing rotation of the rotor 12. In turn, the rotor 12 transmits the braking force from the disc brake assembly 10 to the wheel in order to selectively slow or stop the vehicle in a controlled manner.

Also included in the disc brake assembly 10 is one or more brake insulators, defined herein by first and second brake shims 32A and 32B, respectively. The first brake shim 32A is interposed between the first brake pad 14A and the piston 24, and the second brake shim 32B is interposed between the second brake pad 14B and the caliper housing 22. As seen in FIG. 1, the first shim 32A is disposed between, and coaxially aligned with an apply face 25 of the piston 24 and the face 30A of the backing plate 16A distal from the rotor 12. In a similar regard, the second shim 32B is disposed between, and coaxially aligned with the housing tabs 23 of the caliper housing 22 and the face 30B of the backing plate 16B distal from the rotor 12. The first and second bake shims 32A, 32B include respective first and second sets of claws or grips 36A and 36B configured to interface with and more firmly fasten the first and second shims 32A, 32B to a corresponding counterpart—e.g., the first and second brake pads 14A, 14B.

Figure 2:
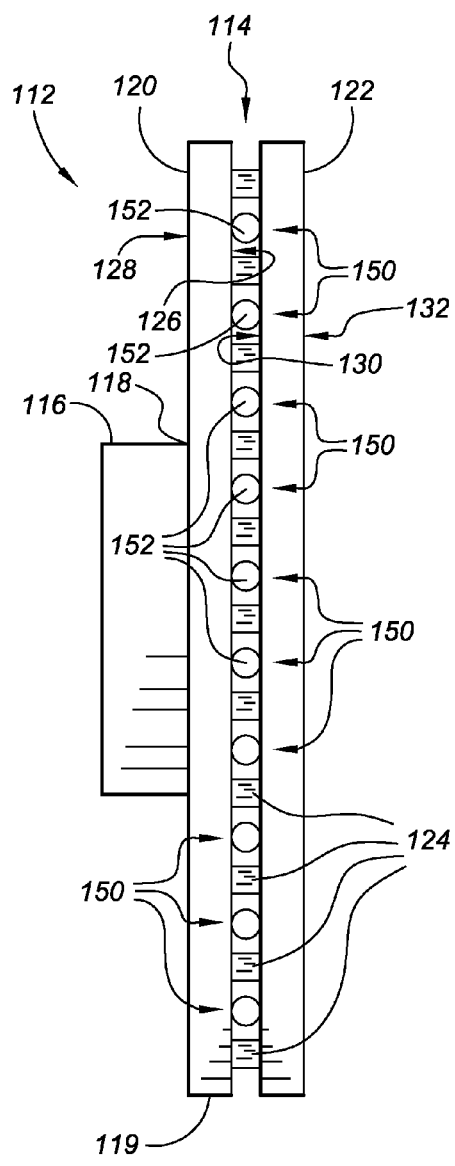
FIG. 2 is a side-view illustration of a brake rotor with embedded loose-mass damper system in accordance with one embodiment of the present invention.

A side-view illustration of a brake rotor with embedded loose-mass damper systems in accordance with one embodiment the present invention is shown in FIG. 2 and indicated generally at 112. The rotor 112 includes an annular rim or disc portion 114 with a mounting hat or flange portion 116 extending substantially orthogonally from an inner peripheral edge 118 thereof. According to the embodiment of FIG. 2, the annular rim portion 114 is defined by first and second coaxially aligned, generally symmetrical disc members 120 and 122, respectively, connected via a plurality of web members or vanes 124 extending therebetween. The first disc member 120 includes a first inner face 126 opposing a first contact face or cheek 128. Similarly, the second disc member 122 includes a second inner face 130 facing the first inner face 126 and opposing a second contact face or cheek 132. Although not shown herein, the first and second disc members 120 and 122 may include other features, including, but not limited to, slots and ports for amplifying braking forces transmitted thereto and venting gases and materials produced as a result of a braking operation (e.g., selective coupling of the brake pads 14A, 14B with the rotor 12 via piston 24 of FIG. 1).

Still referring to FIG. 2, a plurality of loose-mass damper systems, each indicated generally by reference numeral 150, is embedded or interposed within the annular rim portion 114 between the first and second contact faces 128, 132. Each one of the loose-mass damper systems 150 is preferably oriented proximate to an outer peripheral edge 119 of the annular rim portion 114, and disposed generally circumferentially equidistant from one another. To this regard, the loose-mass damper systems 150 are embedded at preselected locations within the annular rim portion 114, and operable to reduce oscillation of the rotor 112 by dissipating kinetic energy directly from the first and second disc members 120 and 122. More specifically, each loose-mass damper system 150 includes at least one mass 152 movably supported between the first and second disc members 120, 122 in a manner sufficient to allow the mass 152 to repeatedly collide with or impact against the first and second inner faces 126, 130. As the rotor 112 is excited dynamically—i.e., through force-coupled excitation, the masses 152 may begin to move freely relative to the rotor 112 resulting in impacts between each mass 152 and the first and second inner faces 126, 130, dissipating or shedding kinetic energy as heat, friction, and high frequency vibrations. Operation of the loose-mass damper systems 150 of the present invention is both temperature and pressure independent.

Figure 2A:
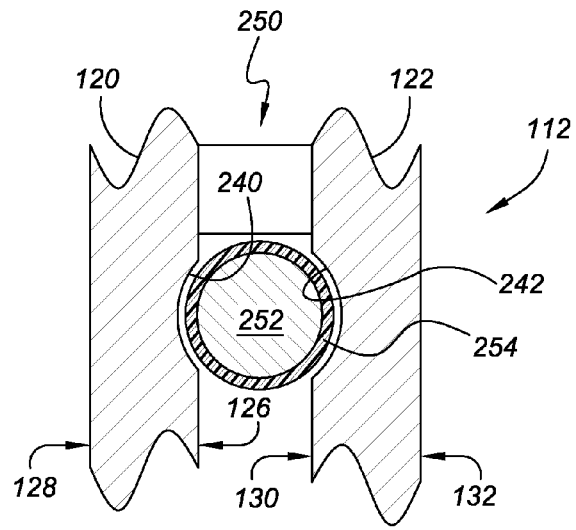
FIG. 2A is cross-sectional view of the brake rotor of FIG. 2 illustrating a loose-mass damper system in accordance with a first configuration embedded therein.
Figure 2B:
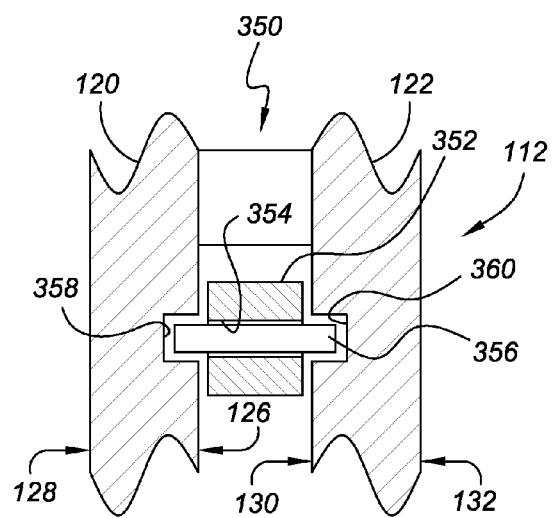
FIG. 2B is cross-sectional view of the brake rotor of FIG. 2A illustrating a loose-mass damper system in accordance with a second configuration embedded therein.
Figure 2C:
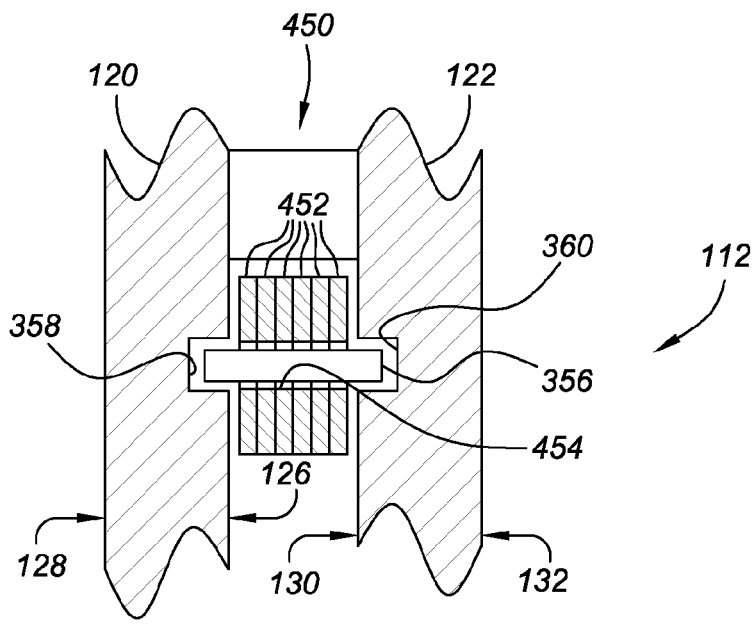
FIG. 2C is cross-sectional view of the brake rotor of FIG. 2A illustrating a loose-mass damper system in accordance with a third configuration embedded therein.

FIGS. 2A-2C illustrate various configurations of loose-mass damper systems in accordance with the present invention that function similarly to the previously described loose-mass damper systems 150 of FIG. 2. For simplicity and brevity, like reference numbers are used in FIGS. 2A-2C to refer to like components from FIG. 2. Correspondingly, the components of FIGS. 2A-2C that are identified with a common reference number to a respective component of FIG. 2 should be considered identical unless specified otherwise. Furthermore, the configurations depicted in FIGS. 2A-2C, like FIG. 2, are not to scale and are provided purely for clarification and explanation purposes. As such, the particular dimensions of the drawings presented herein are not to be considered limiting.

FIG. 2A provides a cross-sectional view of the brake rotor 112 of FIG. 2 illustrating a loose-mass damper system 250 in accordance with a first configuration embedded therein. According to this particular configuration, the first inner face 126 of the first disc member 120 defines a first plurality of semispherical grooves 240 (only one of which is depicted herein). The first plurality of semispherical grooves 240 oppose a second plurality of semispherical grooves 242 (only one of which is depicted herein) defined by the second inner face 130 of the second disc member 122.

A substantially spherical member 252 is embedded between and supported by, in a preferably freely movable manner, respectively opposing first and second semispherical grooves 240, 242. For example, the loose masses—i.e., spherical members 252, are preferably positioned between the rotor vanes, such as web members 124 of FIG. 2. That is, in the early stages of rotor fabrication, spherical cavities (i.e., semispherical grooves 240 and 242) can be designed into these vents (i.e., the passage ways between the vanes 124), and the loose masses 252 can be loosely cast in place. Alternatively, cylindrical holes (not shown) can be generated, by known means, between the cheeks (i.e., disc members 120 and 122 of FIG. 2) in the radial direction. A loose mass 252 is placed in each cylindrical hole, and retained in position by two retainer rings (not shown).

Ideally, the spherical member 252 consists essentially of a steel ball. The spherical member 252 is supported between the first and second disc members 120, 122 in a manner sufficient to allow the spherical member 252 to oscillate back and forth and repeatedly collide with or impact against the first and second inner faces 126, 130, and thereby dissipate kinetic energy directly from the first and second disc members 120, 122. For example, each steel ball may be coated with a layer 254 comprising ceramic, calcium, and clay of required thickness. Each spherical member 252 (e.g., steel ball with layer 254 of coating) is thereafter cast into carefully designed locations within the rotor 112. Once the cast is complete (solidified), the coating is carefully removed to give enough clearance for the spherical members 252 to oscillate. Notably, the geometry of the first and second grooves 240, 242 can be altered without departing from the intended scope of the present invention, so long as the spherical member 252 is free to oscillate back and forth relative to the first and second disc members 120, 122.

FIG. 2B provides a cross-sectional view of the brake rotor 112 of FIG. 2 illustrating a loose-mass damper system 350 in accordance with a second configuration embedded therein. According to this particular configuration, the loose-mass damper system 350 includes a cylindrical member 352 defining an axial channel 354 therethrough. The channel 354 is configured—e.g., of sufficient diameter and length, to receive a dowel or pin 356 therethrough. The dowel 356 extends between the first and second disc members 120 and 122, and is attached thereto, e.g., mates with opposing, laterally aligned first and second blind holes 358 and 360, respectively, defined by the first and second inner faces 126, 130. The dowel 356 is configured to slidably support the cylindrical member 352 thereon, in a preferably laterally translatable manner. More specifically, the cylindrical member 352 is supported between the first and second disc members 120, 122 in a manner sufficient to allow the cylindrical member 352 to oscillate back and forth and repeatedly collide with or impact against the first and second inner faces 126, 130, and thereby dissipate kinetic energy directly therefrom.

FIG. 2C provides a cross-sectional view of the brake rotor 112 of FIG. 2 illustrating a loose-mass damper system 450 in accordance with a third configuration embedded therein. According to this particular configuration, the loose-mass damper system 450 includes a plurality of ring members 452 that are coaxially aligned to define an axial channel 454 therethrough. The channel 454 is configured—e.g., of sufficient diameter and length, to receive a dowel or pin 356 therethrough. The dowel 356 extends between the first and second disc members 120 and 122, and is attached thereto, e.g., mates with opposing, laterally aligned first and second blind holes 358 and 360, respectively, defined by the first and second inner faces 126, 130. The dowel 356 is configured to slidably support the plurality of ring members 452 thereon, in a preferably laterally translatable manner. More specifically, the plurality of ring members 452 is supported between the first and second disc members 120, 122 in a manner sufficient to allow the plurality of ring members 452 to oscillate back and forth and repeatedly collide with or impact against the first and second inner faces 126, 130, and thereby dissipate kinetic energy directly therefrom.

Figure 2D:
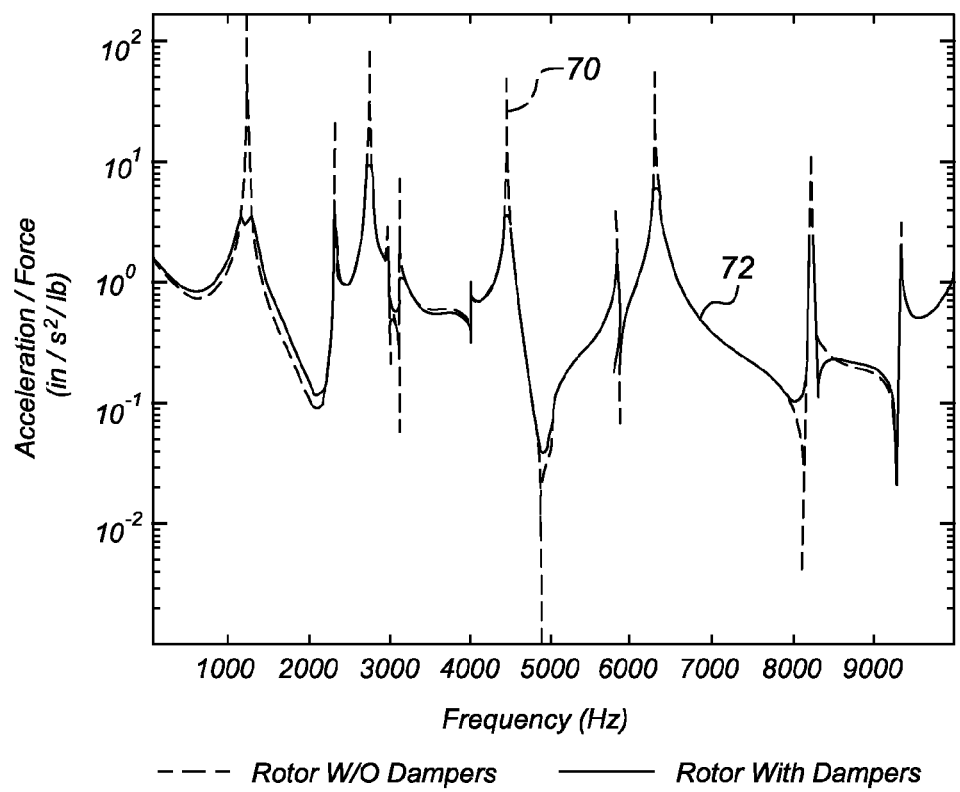
FIG. 2D is a graph of acceleration/force illustrating modal loss factor achieved by the embodiment of FIG. 2A at different modes up to ten (10) kilohertz as compared to a base-line brake rotor without a loose-mass damper system in accordance with the present invention embedded therein.

FIG. 2D is a graph illustrating modal loss factor achieved by the embodiment of FIG. 2A at different modes up to ten kilohertz (kHz) as compared to a base-line brake rotor without a loose-mass damper system embed therein. "Modal loss factor" is an indication of the sound deadening or damping characteristics in a particular specimen. In general, modal analysis is the study of the dynamic characteristics of a mechanical structure. The name "loss factor" derives from the fact that this particular modal analysis measures the ratio of energy dissipated for a particular cycle with maximum potential energy. Specifically, FIG. 2D illustrates the transfer inertance, which is measured as acceleration/force or inch-pounds per second squared ($in/s^2/lb$), at different frequencies up to ten kilohertz, of two comparable rotor configurations— the transfer inertance of a brake rotor without a loose-mass damper system embedded therein is indicated with dashed lines at 70, and the transfer inertance of a brake rotor with a plurality of loose-mass damper systems embedded therein, such as loose-mass damper system 250 of FIG. 2A, is shown with solid lines at 72. At various modal frequencies, such as 1.3 kHz, 2.8 kHz, 4.5 kHz, and 6.3 kHz, significant levels of damping are realized by the system with a loose-mass damper in accordance with the present invention embedded therein.

Turning now to FIG. 3, a side-view illustration of a brake rotor with embedded loose-mass damper systems in accordance with another embodiment of the present invention is indicated generally at 512. The rotor 512 includes an annular rim or disc portion 514 with a mounting hat or flange portion 516 extending substantially orthogonally from an inner peripheral edge 518 thereof. According to the embodiment of FIG. 3, the annular rim portion 514 includes a first contact face or cheek 528 opposing a second contact face or cheek 532.

A plurality of loose-mass damper systems, each indicated generally by reference numeral 550, is embedded or interposed within the annular rim portion 514 between the first and second contact faces 528, 532. Each one of the loose-mass damper systems 550 is preferably oriented proximate to an outer peripheral edge 519 of the annular rim portion 514, and disposed generally circumferentially equidistant from one another. To this regard, the loose-mass damper systems 550 are embedded at preselected locations within the annular rim portion 514, and operable to reduce oscillation of the rotor 512 by dissipating kinetic energy directly from the annular rim portion 514. More specifically, each loose-mass damper system 550 includes at least one loose mass 552 movably supported within the annular rim portion 514 in a manner sufficient to allow each mass 552 to repeatedly collide with or impact against opposing inner contact surfaces, such first and second inner faces 626 and 630, respectively, shown in FIG. 3A. For example, the loose masses 552 can be cast in place between the rubbing surfaces (i.e., first and second contact faces 528, 532) at the time of casting. Another option is to make cylindrical holes in the radial direction between the cheeks. The loose masses 552 are thereafter placed in the cylindrical holes, and retained in position by a retainer ring (not shown). As the rotor 512 is excited dynamically—i.e., through force-coupled excitation, the masses 552 may begin to move freely relative to the rotor 512 resulting in impacts between each mass 552 and the annular rim portion 514, dissipating or shedding kinetic energy as heat, friction, and high frequency vibrations. Operation of the loose-mass damper systems 550 of the present invention is both temperature and pressure independent.

FIG. 3A provides a cross-sectional view of the brake rotor 512 of FIG. 3 illustrating a loose-mass damper system 650 in accordance with a fourth configuration embedded therein. According to this particular configuration, the annular rim portion 514 defines a plurality of cavities or chambers 640 therein. Each cavity 640 has a generally spherical configuration, with first and second laterally opposing, inner contact faces 626 and 630. A substantially spherical member 652 is embedded within the cavity 640, in a preferably freely movable manner, interposed between the first and second inner contact faces 626, 630. Similar to the embodiment of FIG. 2A, the spherical member 652 of FIG. 3A preferably consists of a steel ball that is pre-coated with a removable layer 654 of coating comprising ceramic, calcium, and clay of required thickness. Once each spherical member 652 is properly cast into place within the rotor 512, the layer 654 of coating is carefully removed to provide enough clearance for the spherical members 652 to oscillate. To this regard, each spherical member 652 is supported by the cavity 640 in a manner sufficient to allow the spherical member 652 to oscillate back and forth and repeatedly collide with or impact against the first and second inner contact faces 626, 630, and thereby dissipate kinetic energy directly from the annular rim portion 514.

While the best modes for carrying out the present invention have been described in detail, those familiar with the art to which this invention relates will recognize various alternative designs and embodiments for practicing the invention within the scope of the appended claims.

The invention claimed is:

1. A rotor for use with a brake assembly including a forcing member in operative communication with a friction member to urge the friction member into mechanical communication with the rotor to thereby oppose movement of the same, the rotor comprising:
   a rotor body with an annular rim portion;
   wherein said rim portion includes first and second coaxial disc members;
   a plurality of web members extending between and operatively connecting the first and second coaxial disc members;
   wherein each of the plurality of web members are substantially the same size;
   wherein said first disc member includes a first inner face opposing a first contact face;
   wherein said second disc member includes a second inner face opposing a second contact face;
   wherein said first inner face is axially spaced from and substantially opposes said second inner face;
   wherein said first inner face defines a first blind hole and said second inner face defines a second blind hole laterally aligned with said first blind hole; and
   at least one loose-mass damper system interposed between said first and second inner faces;
   wherein said at least one loose-mass damper system includes:
   a dowel member extending between and operatively attached to said first and second disc members;
   wherein said dowel member extends into said first blind hole and said second blind hole such that said dowel member is attached to said first disc member and said second disc member;
   a cylindrical member slidably supported by said dowel member between said first inner face and said second inner face; and
      wherein said cylindrical member is configured to move axially relative to said annular rim portion and repeatedly collide with each of said first and second inner faces to dissipate kinetic energy directly therefrom.

2. The rotor of claim 1, wherein said cylindrical member is a plurality of ring members slidably supported by said dowel member between said first inner face and said second inner face such that said plurality of ring members oscillate back and forth on said dowel member and repeatedly collide with said first and second inner faces.

3. The rotor of claim 1, wherein said cylindrical member defines an axial channel and said dowel extends through said axial channel.

4. The rotor of claim 1, wherein said axial motion of said cylindrical member is entirely unbiased.

5. A brake assembly for a motorized vehicle having at least one wheel, the brake assembly comprising:
   a rotor having an annular rim portion with a flange portion extending generally orthogonally from an inner peripheral edge thereof, said annular rim portion having a first inner face axially spaced from and substantially opposing a second inner face, said rotor being rotatably mounted to the vehicle via said flange portion such that said rotor is operable to transmit braking forces to the at least one wheel;
   a housing member operatively mounted proximate to said rotating member;
   at least one friction member operatively disposed within said housing member and configured to frictionally engage said rotor;
   an urging member operatively disposed within said housing member and configured to selectively effect the frictional engagement between said at least one friction member and said rotor;
   wherein said first inner face defines a plurality of first blind holes and said second inner face defines a plurality of second blind holes laterally aligned with said plurality of first holes;
   a plurality of loose-mass damper systems interposed between said first and second inner faces;
   wherein each of said plurality of loose-mass damper systems includes:
      a dowel member attached to said annular rim portion; and
      a cylindrical member slidably supported by said dowel member between said first inner face and said second inner face;
   wherein said dowel member of each of said plurality of loose-mass damper systems extends into a respective one of said plurality of first blind holes and second blind holes such that said dowel member is attached to said annular rim portion;
   wherein said cylindrical member is configured to move axially relative to said annular rim portion and repeatedly collide with each of said first and second inner faces to dissipate kinetic energy directly therefrom.

6. The brake assembly of claim 5, wherein said cylindrical member is a plurality of ring members slidably supported by a respective dowel member such that said plurality of ring members oscillate back and forth on said respective dowel member and repeatedly collide with said first and second inner faces.

7. The brake assembly of claim 1, wherein said rim portion includes first and second coaxial disc members and further comprising:
   a plurality of web members extending between and operatively connecting the first and second coaxial disc members;
   wherein each of the plurality of web members are substantially the same size;
   wherein said first disc member includes said first inner face opposing a first contact face;
   wherein said second disc member includes said second inner face opposing a second contact face;
   wherein said first inner face faces said second inner face;
   wherein said dowel member extends between and is operatively attached to said first and second disc members.

8. The brake assembly of claim 5, wherein said cylindrical member defines an axial channel and said dowel extends through said axial channel.

* * * * *

UNITED STATES PATENT AND TRADEMARK OFFICE
CERTIFICATE OF CORRECTION

PATENT NO. : 8,511,440 B2
APPLICATION NO. : 11/968769
DATED : August 20, 2013
INVENTOR(S) : Kappagantu It is certified that error appears in the above-identified patent and that said Letters Patent is hereby corrected as shown below:

In the Claim

Column 10, Line 42, Claim 7: "claim 1" should be -claim 5-

Signed and Sealed this
Fourth Day of February, 2014

Michelle K. Lee
*Deputy Director of the United States Patent and Trademark Office*